(12) United States Patent
Abraham et al.

(10) Patent No.: US 7,887,424 B2
(45) Date of Patent: Feb. 15, 2011

(54) TOOL FOR REPAIRING DAMAGED SCREW THREADS

(76) Inventors: Moshe Abraham, Shilo, Mobile Post Ephraim 44830 (IL); Zeev Stahl, 43/4 Haim Toren Street, Pisgat Zeev, Jerusalem 97823 (IL); Binyamin Fredkin, Gush Etzion, P.O. Box 179, Alon Shvut 90433 (IL)

( * ) Notice: Subject to any disclaimer, the term of this patent is extended or adjusted under 35 U.S.C. 154(b) by 859 days.

(21) Appl. No.: 10/591,935

(22) PCT Filed: Mar. 7, 2005

(86) PCT No.: PCT/IL2005/000267
§ 371 (c)(1),
(2), (4) Date: Aug. 8, 2007

(87) PCT Pub. No.: WO2005/084864
PCT Pub. Date: Sep. 15, 2005

(65) Prior Publication Data
US 2008/0064512 A1 Mar. 13, 2008

(30) Foreign Application Priority Data
Mar. 7, 2004 (IL) ............................. 160767

(51) Int. Cl.
*B21J 13/02* (2006.01)
(52) U.S. Cl. .................. 470/185; 470/66; 470/67; 470/190
(58) Field of Classification Search .............. 470/10, 470/57, 58, 66, 67, 80, 81, 185, 186, 187, 470/188, 189, 190; 408/215, 222; 72/88, 72/91, 102, 407
See application file for complete search history.

(56) References Cited

U.S. PATENT DOCUMENTS

| 1,854,389 | A | * | 4/1932 | Arndt ........................... 30/102 |
| 2,388,790 | A | * | 11/1945 | Mackliet ..................... 470/209 |
| 2,504,539 | A |   | 4/1950 | Lambrakos |
| 3,253,322 | A | * | 5/1966 | Christian ...................... 407/78 |
| 3,688,323 | A | * | 9/1972 | Bruck et al. ................ 470/209 |
| 3,793,659 | A | * | 2/1974 | Edgar ......................... 470/209 |
| 4,150,450 | A |   | 4/1979 | Laub et al. |
| 4,631,994 | A | * | 12/1986 | Jester et al. ................... 82/158 |
| 5,060,330 | A |   | 10/1991 | Stahl et al. |
| 5,224,900 | A |   | 7/1993 | Hai |

(Continued)

FOREIGN PATENT DOCUMENTS

GB         778807       *    7/1957

*Primary Examiner*—Edward Tolan
(74) *Attorney, Agent, or Firm*—Bryan Cave LLP

(57) ABSTRACT

There is provided a tool for repair of damaged threads of screws, including a body (2) having a projecting portion (4) for accommodating a screw to be repaired and having two recessed major surfaces; a cutting blade (6), having a rear end hingedly articulated to the body (2), and a front end in the shape of a cutting face (46) substantially fitting the type of thread to be repaired; a guide blade (7) having a rear end hingedly articulated to the body (2), and a front end substantially fitting the type of thread to be repaired, the guide blade projecting beyond the cutting face of the cutting blade, and; means (10, 12, 14) to alter the distance between the front ends and the projecting body portion (4) to accommodate screws of different diameters.

18 Claims, 4 Drawing Sheets

U.S. PATENT DOCUMENTS

| | | | |
|---|---|---|---|
| 5,647,803 A * | 7/1997 | Killer | 470/67 |
| 5,733,075 A | 3/1998 | Basteck | |
| 6,544,127 B1 | 4/2003 | Abraham et al. | |
| 6,589,122 B1 | 7/2003 | Chen | |

* cited by examiner

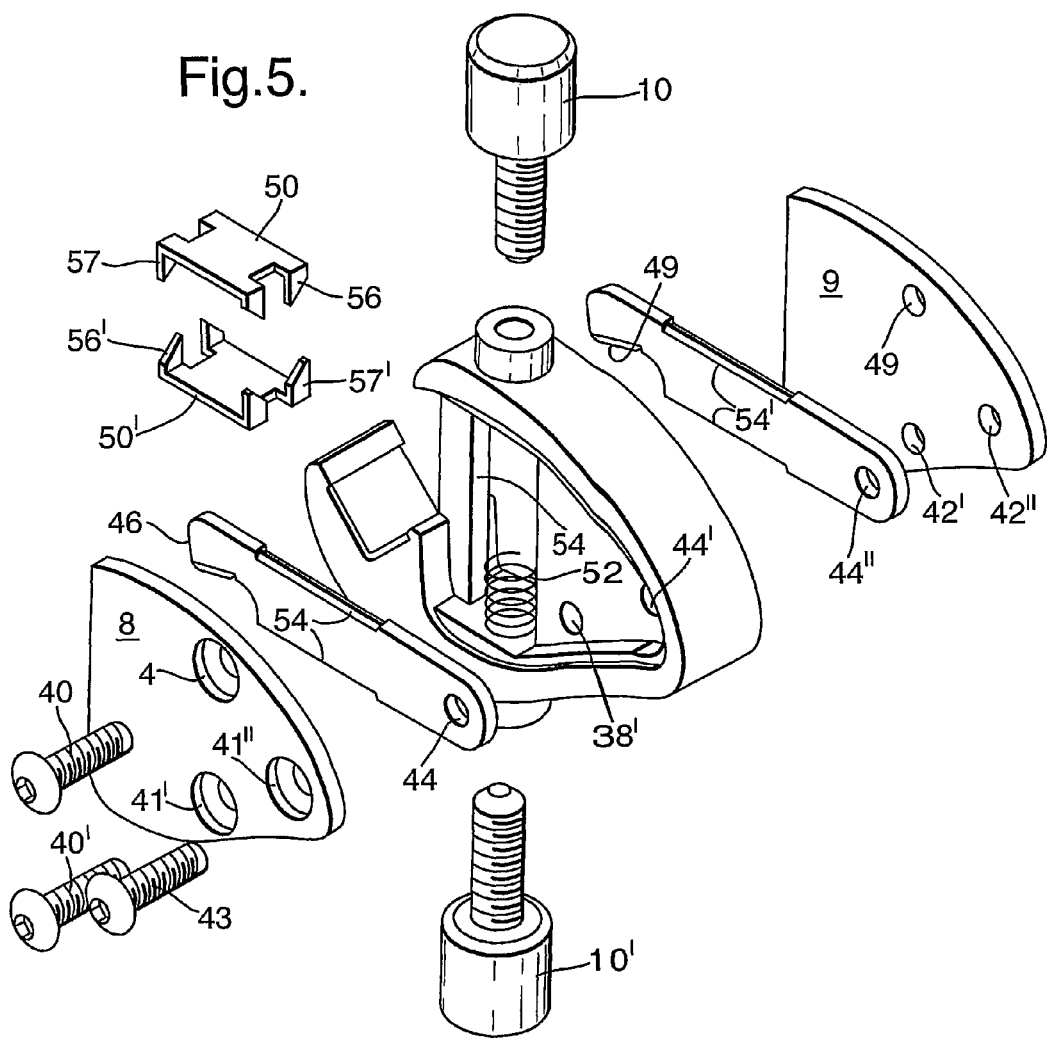
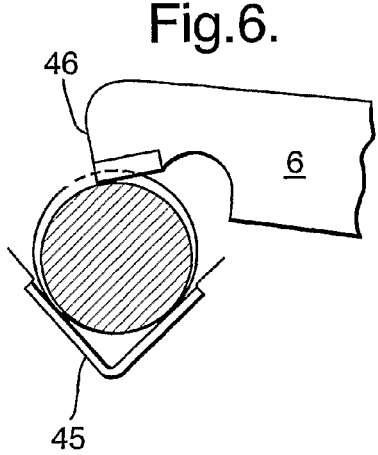

TOOL FOR REPAIRING DAMAGED SCREW THREADS

This application is the National Stage of International Application No. PCT/IL2005/000267, filed Mar. 7, 2005.

FIELD OF THE INVENTION

The present invention relates to a chasing tool for repairing damaged threads of screws.

BACKGROUND OF THE INVENTION

Threads, especially screw threads, are sensitive to damage caused by impact, due to their sharp crests which are easily nicked or otherwise deformed and which, when so damaged, make it difficult to apply nuts or other matching parts. Experienced mechanics are careful not to apply such components forcibly, as their own threads might be damaged in the process. Damaged screw threads should therefore be repaired before, say, reassembly of threaded components. While, in principle, screw threads can be repaired with the aid of threading dies, this could necessitate the acquisition of several large and expensive sets of dies, one set for each of the several thread standards of which, in automotive applications alone, there are at least five. For the average workshop or garage, not to speak of the "do-it-yourself" man in his basement shop, this is quite impractical. It is, of course, also possible to use a triangular file for screw thread repair; this, however, requires a considerable amount of skill, is time-consuming and mostly yields poor results.

Such a tool is disclosed in U.S. Pat. No. 5,060,330, obtained by the present Applicant and incorporated herein by reference.

While this prior-art tool indeed constitutes a considerable improvement on other existing tools, it is not only relatively bulky and heavy, but the absence of any guiding element for the cutters is liable to cause difficulties, in particular with heavily damaged threads.

DISCLOSURE OF THE INVENTION

It is therefore one of the objects of the present invention to provide a tool for the repairing of damaged threads of screws that is not only lightweight and slim, simple to handle, easily assembled and relatively inexpensive, but is designed to provide guidance to the active butting blade, thereby greatly facilitating the thread-repair action of the tool.

According to the invention, this is achieved by providing a tool for repair of damaged threads of screws, comprising a body having a projecting portion for accommodating a screw to be repaired and having two recessed major surfaces; a cutting blade, having a rear end hingedly articulated to said body, and a front end in the shape of a cutting face substantially fitting the type of thread to be repaired; a guide blade having a rear end hingedly articulated to said body, and a front end substantially fitting the type of thread to be repaired, said guide blade projecting beyond the cutting face of said cutting blade, and; means to alter the distance between said front ends and said projecting body portion to accommodate screws of different diameters.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purpose of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a perspective view of the tool according to the present invention;

FIG. 2 shows the tool of FIG. 1, with one of the covers removed;

Figure 1:
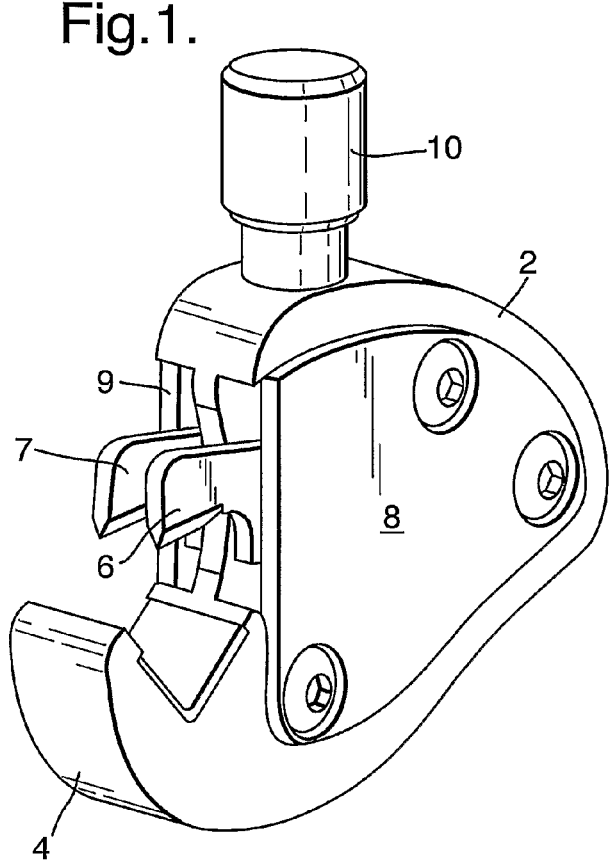
Figure 3:
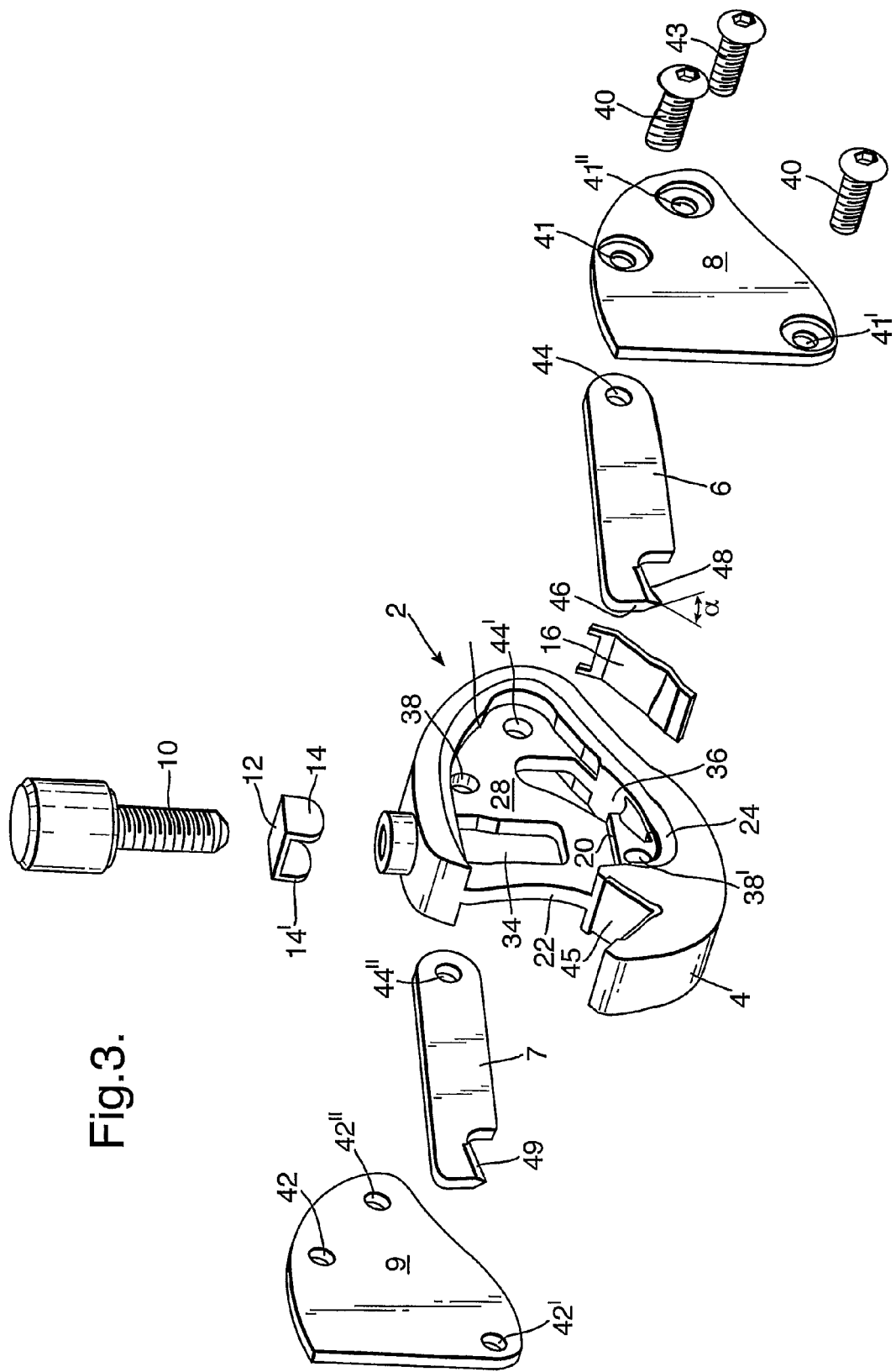
Figure 4:
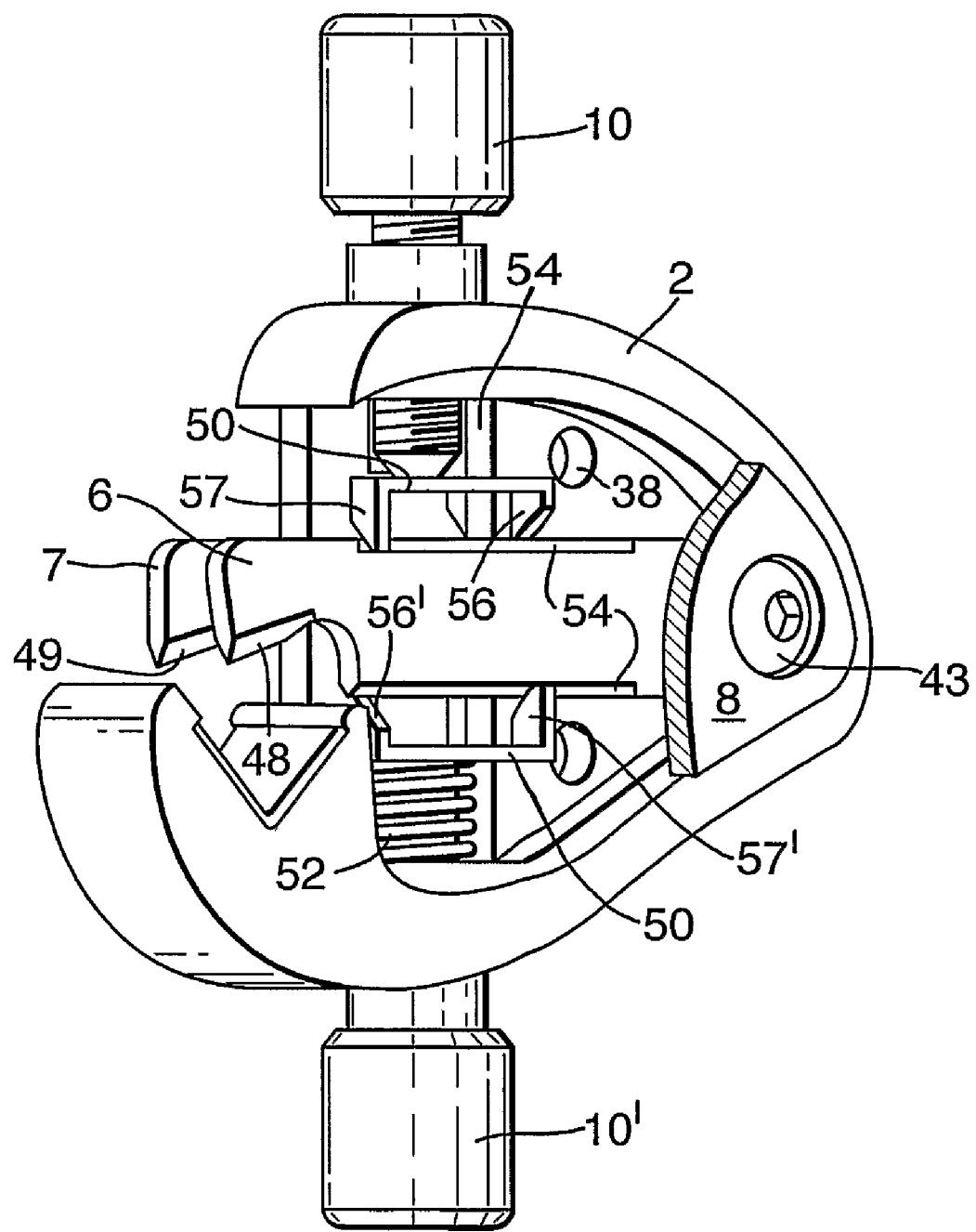

FIG. 3 presents an exploded view of the tool of FIG. 1;

FIG. 4 is a perspective view of another embodiment of the tool according to the invention;

FIG. 5 presents an exploded view of the tool of FIG. 4;

FIG. 6 is an enlarged view of the cutting blade inside a thread groove, and

FIG. 7 is an enlarged view of the guide blade inside a thread groove.

DETAILED DESCRIPTION OF THE PREFERRED EMBODIMENTS

Referring now to the drawings there is seen in FIG. 1 a fully assembled tool according to the invention. Clearly seen are a recessed body 2, a V-block-like projection 4, a cutting blade 6, a guide blade 7, two covers 8, 9 and a setting thumbscrew 10.

Figure 2:
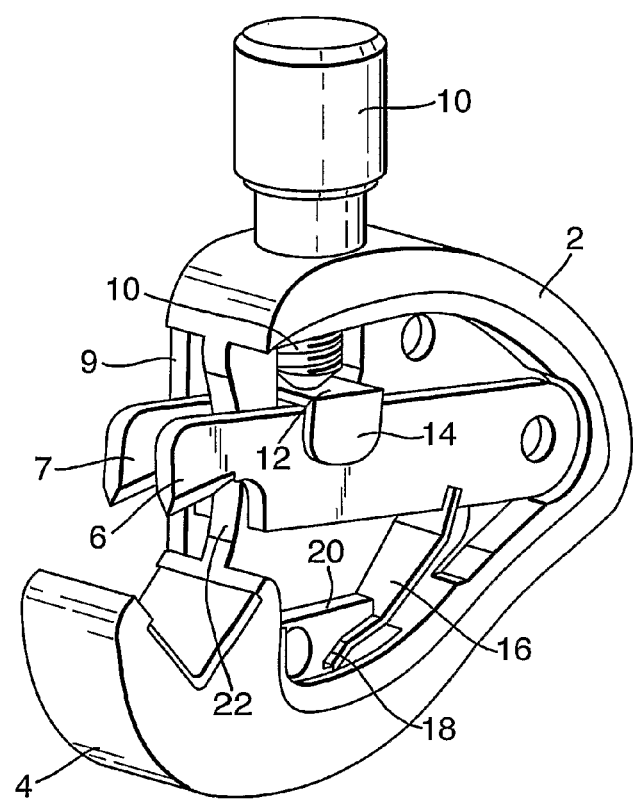

In FIG. 2, cover 8 has been removed, revealing the inside of the assembled tool. Also seen is a pressure pad 12 having two integral lobes 14, 14', of which only one can be seen. Further shown is a flat spring 16, the lower end of which is anchored in an appropriately shaped slot 18 in a lower, heavier portion 20 of a central wall 22 of the tool. The upper end of spring 16 is applied against blades 6, 7 and opposes their being lowered by thumbscrew 10. Conversely, when thumbscrew 10 is turned in the unscrewing sense, spring 16 raises blades 6, 7, maintaining the contact between pressure pad 12 and the end of thumbscrew 10.

In the exploded view of FIG. 3, there is seen body 2 with its multi-level recesses, the outermost of which is level 24 in which is seated cover 8, then level 26 which is defined by the above-mentioned wall portion 20, and finally level 28, which defines the central wall 22. Obviously, levels 24', 26' and 28' are on the opposite, unseen face of body 2.

Further seen in the drawing of body 2 are four openings in central wall 22, a first, window-like opening 34 along which slides pressure pad 12 with its lobes 14 when the tool is adjusted for different screw diameters; a second, approximately triangular opening 36 through which passes, and in which flexes, spring 16 acting on blades 6, 7 and two holes 38, 38' through which pass screws 40, 40' located in countersunk holes 41, 41' and fitting threaded holes 42, 42' in cover 9, thereby, upon assembly, retaining covers 8, 9. A third screw, 43, passes through hole 41" in cover 8, hole 44 in blade 6, hole 44' in body wall 22, hole 44" in blade 7, and screws into threaded hole 42" in cover 9. Screw 43 thus serves as pivot for blades 6 and 7, around which the blades can swivel.

Also seen is a hard-metal lining 45 which protects the active surfaces of V-block-like projection 4.

Blade 6 has a cutting face 46, a cutting edge 48 and a cutting angle $\alpha$ appropriate for the type of thread to be repaired. Blade 7, which does not participate in the cutting action, is provided with a guide chamfer 49 having the same angle α. Also, it has no cutting face. In fact, as will be seen in FIG. 7, its end does not touch the thread, projecting as it does beyond the point of tangency of the screw to be repaired and is therefore slightly longer than cutting blade 6.

As the distance between cutting edge 48 and guide chamfer 49, must be as close as possible to a multiple of the pitch of the thread to be repaired, there must be some leeway in the confinement of blades 6, 7 by covers 8, 9 and pivot screw 43, so that blades 6, 7, upon being lowered into the threads, may adjust themselves to that distance.

In operation, the screw or bolt to be repaired is placed into V-block 4, if necessary by first raising blades 6, 7 by rotating thumbscrew 10 in the counter-clockwise sense, and then lowering them until cutting face 46 and guide chamfer 49, have entered the tooth spaces, and the above-mentioned adjustment has been achieved. Then, the screw or bolt is rotated—or the tool is rotated about the bolt, if stationary—until the obstruction caused by the damage is shaved off. In case of severe damage, the repair work may have to be carried out in steps.

A second embodiment of the present invention, illustrated in FIG. 4, differs from the embodiment of FIG. 1 in several details, the aim of which is to securely lock the distance between cutting edge 48 and guide chamfer 49, once it has been adjusted in the manner described above. This is achieved by the provision of two pressure pads 50, 50', shown in FIG. 5, and two thumbscrews 10, 10'. To accommodate these components, as well as a helical compression spring 52, which replaces flat spring 16 of FIG. 3, window-like opening 34, now 54, has been lengthened to extend across the entire width of the tool. Furthermore, portions of the upper and lower edges of blades 6, 7 are provided with double-faced chamfers designed to interact with lobes 56, 57, 56' 57' of pressure pads 50, 50'.

The exploded view of FIG. 5 shows the two pressure pads 50, 50' in full. It is seen that pressure pads 50, 50' comprise two pairs of two lobes 56 and 57, respectively 56' and 57' each, with each pair extending in planes substantially perpendicular to the major surfaces of body 2.

It is further seen that each of the lobes is configured as an inclined plane, with the planes of one of these lobe pairs being outwardly inclined, while the planes of the other lobe pair are inwardly inclined. In assembly, the outwardly inclined lobe planes of pressure pad 50 face the inwardly inclined planes of pad 50', and vice-versa.

In operation, the distance between cutting edge 48 and guide chamfer 49, is adjusted as described, then thumbscrews 10,10' are slowly and alternatingly rotated. As lobes 57, riding on the outward face of the double-chamfer and lobes 56 riding on the inward face of the chamfer are opposed by lobes 56' and 57' which have the opposite effect, a locking action is produced which maintains the distance between cutting edge 48 and guide chamfer 49, even with seriously damaged threads.

FIG. 6 shows cutting blade 6 in action, with cutting face 46 at, or near, the point of tangency, depending on the size of the screw to be repaired, while FIG. 7 shows guiding blade 7 with the same screw. It is clearly seen that guide chamfer 49 projects beyond the point of tangency. Obviously, guide blade 7 is longer than cutting blade 6.

The parameters of cutting blade 6 are such that the inclination of cutting face 46 with respect to the radial plane at point of tangency is optimal over a given range of screw diameters.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A tool for repair of damaged threads of screws, comprising:
   a body having a projecting portion for accommodating a screw to be repaired and having two recessed major surfaces;
   a cutting blade having a rear end hingedly articulated to said body, and a front end in the shape of a cutting face substantially fitting the type of thread to be repaired;
   a guide blade having a rear end hingedly articulated to said body, and a front end substantially fitting the type of thread to be repaired, said guide blade projecting beyond the cutting face of said cutting blade, and
   means to alter the distance between said front ends and said projecting body portion to accommodate screws of different diameters.

2. The tool as claimed in claim 1, wherein said rear ends of said cutting blade and said guide blade are each provided with a bore adapted to accommodate a pivot, whereby said blades hingedly articulated to said body.

3. The tool as claimed in claim 1, wherein the front end of said guide blade is in the shape of a guide chamfer of an angle substantially fitting the type of thread to be repaired.

4. The tool as claimed in claim 1, wherein said means to alter the distance is at least one thumbscrew adapted to exert pressure on said blades against the biasing force of spring means.

5. The tool as claimed in claim 4, wherein said pressure is applied via a pressure pad straddling said blades by means of lobes integral with said pad.

6. The tool as claimed in claim 4, wherein said spring means is a substantially flat spring, one end of which is anchored in said body and the other end of which is applied against said blades.

7. The tool as claimed in claim 1, wherein said projecting portion is in the form of a V-block.

8. The tool as claimed in claim 7, wherein the active surfaces of said V-block are provided with hard-metal linings.

9. The tool as claimed in claim 1, further comprising two cover plates seated in said body, one cover plate having a plurality of threaded holes and the other one having a plurality of through holes, in assembly, each of said through holes being aligned with one of said threaded holes.

10. The tool as claimed in claim 9, further comprising a plurality of screws passing through said through holes and fitting into said threaded holes, in assembly, one of said screws serving as pivot to said blades.

11. The tool as claimed in claim 4, wherein said means to alter the distance is two thumbscrews.

12. The tool as claimed in claim 4, wherein said pressure is applied via two pressure pads straddling said blades from above and below, respectively, by means of lobes integral with said pads.

13. The tool as claimed in claim 5, wherein said pressure pad comprises two lobes extending in planes substantially parallel to said major surfaces of said body.

14. The tool as claimed in claim 5, wherein said pressure pad comprises two pairs of two lobes each, each pair extending in planes substantially perpendicular to said major surfaces of said body.

15. The tool as claimed in claim 14, wherein each lobe of said pairs of lobes is configured as an inclined plane, the planes of one of said pairs being outwardly inclined, while the planes of the other one of said pairs are inwardly inclined.

16. The tool as claimed in claim 5, wherein at least portions of the upper and lower straight edges of said blades are provided with chamfers adapted to cooperate with inclined planes of said lobes.

17. The tool as claimed in claim 4, wherein said spring means is a helical compression spring seated around one of said at least one thumbscrew.

18. The tool as claimed in claim 11, wherein said spring means is a helical compression spring seated around one of said two thumbscrews.

* * * * *